(12) United States Patent
Erlewein et al.

(10) Patent No.: US 11,918,431 B2
(45) Date of Patent: Mar. 5, 2024

(54) DEVICE FOR CLEANING TEETH

(71) Applicant: Ehmann & Partner GmbH, Gundelsheim (DE)

(72) Inventors: Marco Erlewein, Gundelsheim (DE); Klaus Harbarth, Gundelsheim (DE)

(73) Assignee: Ehmann & Partner GmbH, Gundelsheim (DE)

( * ) Notice: Subject to any disclaimer, the term of this patent is extended or adjusted under 35 U.S.C. 154(b) by 607 days.

(21) Appl. No.: 17/259,942

(22) PCT Filed: Jul. 10, 2019

(86) PCT No.: PCT/DE2019/000182
§ 371 (c)(1),
(2) Date: Jan. 13, 2021

(87) PCT Pub. No.: WO2020/011296
PCT Pub. Date: Jan. 16, 2020

(65) Prior Publication Data
US 2021/0267734 A1   Sep. 2, 2021

(30) Foreign Application Priority Data
Jul. 13, 2018   (DE) ............ 20 2018 003 268.9

(51) Int. Cl.
*A61C 17/22*   (2006.01)
*B33Y 80/00*   (2015.01)

(52) U.S. Cl.
CPC ............ *A61C 17/228* (2013.01); *B33Y 80/00* (2014.12)

(58) Field of Classification Search
CPC ....... A61C 17/34; A61C 17/00; A61C 17/228; A61C 7/08; A61C 19/00
See application file for complete search history.

(56) References Cited

U.S. PATENT DOCUMENTS

| | | | |
|---|---|---|---|
| 4,164,940 A | 8/1979 | Quinby | |
| 2012/0189976 A1 | 7/2012 | McDonough et al. | |
| 2013/0236851 A1 | 9/2013 | McDonough et al. | |
| 2015/0173856 A1* | 6/2015 | Lowe ...................... | A61C 7/00 433/2 |
| 2018/0184795 A1 | 7/2018 | Pai et al. | |
| 2018/0228581 A1 | 8/2018 | Ouyang | |

(Continued)

FOREIGN PATENT DOCUMENTS

| | | |
|---|---|---|
| DE | 20309088 U1 | 9/2003 |
| DE | 202009008362 U1 | 10/2009 |

(Continued)

OTHER PUBLICATIONS

Japan Patent Office, Office Action in related Japanese Patent Appln. No. 2021-524098.

*Primary Examiner* — Shay Karls

(57) ABSTRACT

The invention relates to a device (10) for cleaning teeth. The device (10) has a mouthpiece (20) in the form of a substantially horseshoe-shaped dental arch (22), a retaining unit (26) and a motor drive (28). The dental arch (22) is designed as a closed hollow body, and the side of the hollow body (22) that faces the teeth has a tooth-cleaning film (34, 36). The tooth-cleaning film (34, 36) has an individualized surface contour matched to the tooth shape and jaw shape and can made set into oscillation by the motor drive (28).

18 Claims, 1 Drawing Sheet

(56) References Cited

U.S. PATENT DOCUMENTS

| | | |
|---|---|---|
| 2019/0015181 A1 | 1/2019 | Pitzer et al. |
| 2019/0282348 A1 | 9/2019 | Musialek |

FOREIGN PATENT DOCUMENTS

| | | |
|---|---|---|
| DE | 102015109891 A1 | 12/2016 |
| JP | 2004057315 A | 2/2004 |
| JP | 2006101941 A | 4/2006 |
| JP | 2007105190 A | 4/2007 |
| JP | 2015509430 A | 3/2015 |
| WO | 2010145781 A1 | 12/2010 |
| WO | 2017035979 A1 | 3/2017 |
| WO | 2018014061 A1 | 1/2018 |

* cited by examiner

DEVICE FOR CLEANING TEETH

TECHNICAL FIELD

The disclosure relates to a device for cleaning teeth. Cleaning of teeth must take place regularly in order to prevent tooth diseases, such as tooth decay or periodontal disease. Cleaning of teeth should preferably be carried out several times daily.

BACKGROUND

Devices for cleaning teeth are known. Manual hand toothbrushes, which may have different types of bristles, are widespread. Furthermore, there are also electric toothbrushes, in which the cleaning bristles are set into motion, for example into rotation or into oscillation, by a motor drive arranged in the gripping element. Both the hand toothbrushes and the electric toothbrushes are designed respectively for cleaning a single tooth so that the toothbrushes have to be guided gradually along the entire set of teeth.

Furthermore, devices for cleaning teeth are known which have at least one approximately horseshoe-shaped mouthpiece. Such a mouthpiece may be put over all teeth of the lower jaw or the upper jaw so that all teeth of the respective jaw may be cleaned at the same time.

Such a device is known, for example from WO 2018/014061 A1. The mouthpiece in this case is fitted with a plurality of silicone bristles which should clean the entire jaw. It is thus not taken into account that each tooth is shaped individually.

Differences in upper jaw or lower jaw, undercuts on the gingival margin, depressions in the fissures, differences in tooth width and tooth length and tooth displacements are also not taken into account in the mouthpieces known in the state of the art. Optimum tooth cleaning with these mouthpieces is thus usually not possible.

SUMMARY

An object of the disclosure is to provide an improved device for cleaning teeth, with which optimum tooth cleaning is possible with as low as possible polishing effort.

The device for cleaning teeth has a mouthpiece in the form of a substantially horseshoe-shaped dental arch, a retaining unit, and a motor drive. The dental arch is designed as a closed hollow body. The side of the hollow body that faces the teeth thus has a tooth-cleaning film which has an individualized surface contour matched to the tooth shape and jaw shape. The tooth-cleaning film may be set into oscillation by the motor drive. By using a sound-wave drive as the motor drive, the tooth-cleaning film may be stimulated in all three axes.

In the dental arch, bristle bundles are thus no longer used for tooth cleaning, since they have proved to be inadequate for transmission of oscillations.

The abrasive polishing bodies in the toothpaste play a crucial role in any type of tooth cleaning. Stimulated by a sound-wave drive, oscillations are transmitted from the tooth-cleaning film to the toothpaste and its polishing bodies in the device and tooth cleaning takes place directly on the tooth surface. Hence, all teeth may be reached at the same time and removal of plaque and stains may take place particularly effectively by direct vibration transfer from the tooth-cleaning film to the teeth. Furthermore, advance into the approximal cavities and other difficult-to-access regions is also facilitated.

In contrast to the devices for cleaning teeth known in the state of the art, the device of the invention has a tooth-cleaning film which is matched individually to the respective upper jaw and/or lower jaw rows of teeth and preformed topographically. The tooth-cleaning film thus runs at a distance (offset) of about 0.1 millimeter to 2 millimeters from the tooth surface. Hence, it is necessary, for example, to have the dentist carry out a 3D scan of the teeth. Alternatively, the three-dimensional data of the jaws and of the occlusion situation may be shown analogously and the latter subsequently scanned. On the basis of these 3D scans, the tooth-cleaning film may be prestructured with the image of the respective rows of teeth. This facilitates production of a made-to-measure, individualized mouthpiece which facilitates optimum tooth-cleaning. The tooth-cleaning film is matched entirely to the three-dimensional topography of the jaw shape and tooth shape. Hence, in particular also individual displacements of the teeth or even tooth gaps may be taken into account without problems. A different number of teeth of the lower jaw compared to the upper jaw may also be shown.

So that all teeth are included and cleaned at the same time, the polishing period required may also be significantly reduced. Furthermore, errors in polishing technique, for example too high a pressure on teeth and gums or even an incorrect polishing angle, may be avoided.

In principle, the closed hollow body may be filled with a liquid or with a gas. When filling with a liquid, highly viscous liquids, such as for example oils, may also be used. Filling with a gas may be realized in particular by filling with air. The use of a liquid within the hollow body facilitates maintenance of a constant contact pressure of the tooth-cleaning film on the teeth. This ensures an optimum polishing result.

It would be possible to design the dental arch of the mouthpiece of the device only for the teeth of the upper jaw or also only for the teeth of the lower jaw. In this case, in total two devices would be necessary for cleaning all teeth; cleaning the teeth of the upper jaw and cleaning the teeth of the lower jaw would take place one after another. Such an embodiment may be advantageous if greater changes are to be expected only for the teeth of one jaw in a shorter time, so that new 3D scans are necessary relatively quickly one after another and hence also new dental arches have to be produced. This may be provided, for example, in the correction of a tooth displacement by a tooth brace if only the teeth of one jaw have to be corrected by a tooth brace.

In a particularly preferred embodiment, the hollow body of the dental arch may have a first tooth-cleaning film for the upper jaw and a second tooth-cleaning film for the lower jaw, which have respectively an individualized surface contour matched to the tooth shape and jaw shape. Simultaneous cleaning of the teeth of the upper jaw and of the lower jaw is possible in this manner so that the time effort for polishing the teeth may be minimized. The two tooth-cleaning films for the upper jaw and for the lower jaw may thus preferably consist of identical material.

Preferably, starting the cleaning process can take place not as conventionally by finger pressure on a button. Rather, automatic activation may take place via the mouth movement. Hence, the dental arch may have a pressure sensor for switching on and switching off the motor drive. This pressure sensor may preferably be arranged in the region of the front incisors, since the incisors have no masticatory surface. The pressure sensor would therefore not reduce the available cleaning surface. Such a pressure sensor may yield under the pressure of the front teeth and actuate a sensor lying underneath. A certain minimum pressure—for example a pressure of 100 grams per square centimeter—may preferably be necessary to start the motor drive. Due to sensitive pressure monitoring, when a threshold value is exceeded—for example a pressure of 250 grams per square centimeter—a visual or acoustic user alarm may be effected and/or the oscillation of the motor may be changed or even stopped.

To clean teeth, for example a tooth-cleaning film may be used which is prestructured with the three-dimensional profile of the individual rows of teeth by shaping by means of deep drawing or hot stamping. Alternatively, the tooth-cleaning film may be shaped by means of deep drawing, hot stamping, dip molding, casting, by 3D-printing methods or by injection-molding methods. The tooth structure is optimally surrounded by the tooth-cleaning film due to the build-up of contact pressure. Hence, a maximum contact surface between the tooth-cleaning film as the tooth-cleaning medium and the teeth may be produced. Alternatively, the tooth-cleaning film may have an offset from the tooth surface. Such an offset may be in particular between 0.01 millimeter and 2 millimeters.

Since the tooth-cleaning film is in direct contact with the mucous membrane of the mouth cavity, it may not be toxic. Furthermore, the tooth-cleaning film should be suitable for foodstuff contact (biocompatible) and latex-free. In order to transfer the oscillation energy in optimum manner to the tooth surface and to facilitate sufficient distance of the biofilm from the teeth, the tooth-cleaning film should furthermore have a certain stiffness. At the same time, the film material should be soft enough in order not to injure the gums. In particular tooth-cleaning films made of silicone have proven to be particularly suitable in this context. Also tooth-cleaning films made of thermoplastic polyurethane or other elastic materials are conceivable. A combination of several materials may additionally increase graduation of the tooth-cleaning film and hence its effectiveness.

The motor drive may be arranged in particular within the retaining unit, which simplifies handling of the device. In this case, releasable attachment of the mouthpiece to the retaining unit may bring with it a few advantages with regard to the cleaning possibilities of the mouthpiece. Furthermore, the mouthpiece may be exchanged and replaced regularly in this manner without the retaining unit also having to be exchanged. Alternatively, the retaining unit may be connected permanently to the mouthpiece. The motor drive may in this case preferably be inserted into the retaining unit on the inside and hence attached to the latter. Here too, exchange of the mouthpiece with retaining unit is possible without the motor drive necessarily also having to be exchanged.

In order to design the ergonomics and wearer comfort as positively as possible, as compact as possible dimensioning of the dental arch and hence also of the entire mouthpiece is necessary. Therefore, the mouthpiece should consist of a functionally graduated material and be able to be produced preferably by means of a 3D-printing method.

The motor drive may preferably have a sound generator. The sound may thus be generated in particular electromagnetically, pneumatically or via a piezo element.

The dental arch may preferably have individualized contact points in order to be able to position the mouthpiece in optimum manner on the two jaws. Since the tooth-cleaning films for the upper jaw and the lower jaw are relatively thin and hence flexible, incorrect positioning of the upper jaw and lower jaw of the user in the mouthpiece is prevented by the contact points. Only when the tooth-cleaning films are pressed by the teeth of the user with sufficient pressure on the contact points is correct positioning ensured and the motor drive may be started. Hence, also only then may the cleaning process be started. Since only restricted oscillation of the tooth-cleaning films is possible in the region of the contact points, the contact points should be kept as small as possible and be arranged at such points which are as non-critical as possible during the cleaning process. The contact points may preferably be arranged in the region of the front teeth and/or at the distal margin strips of the respective last teeth (molar teeth or wisdom teeth).

In principle, cleaning the teeth of a human being or also cleaning the teeth of an animal—for example a dog, a cat or a horse—may be possible with the device. The device may be used for children and for adults. A new 3D scan of the teeth should thus be produced at regular intervals in order to be able to make changes in the tooth structure. This may be more often the case in particular in the transition time between the set of milk teeth and the adult set of teeth.

Further advantages and features of the invention can be seen from the features also indicated in the claims and the example below.

BRIEF DESCRIPTION OF THE DRAWINGS

The invention is described and illustrated in more detail below using the example shown in the drawing, in which.

DETAILED DESCRIPTION

Figure 1:
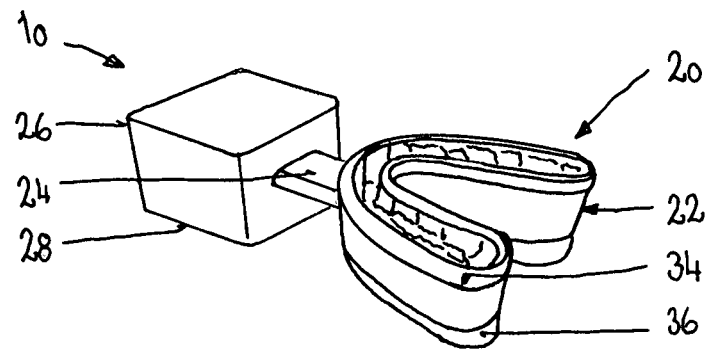
FIG. 1 shows a perspective view of the device for cleaning teeth.
Figure 2:
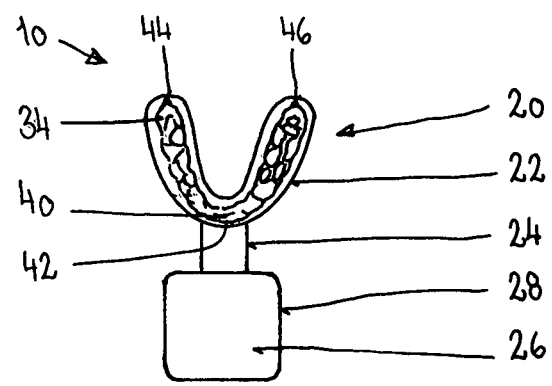
FIG. 2 shows a plan view of the device according to FIG. 1.
Figure 3:
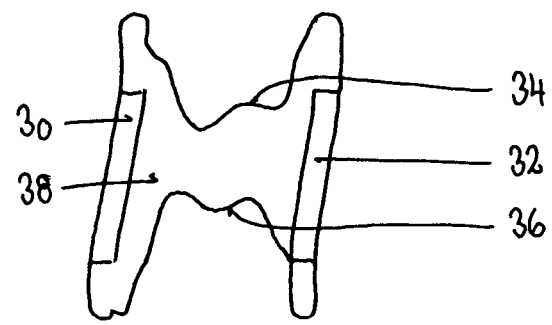
FIG. 3 shows a cross-section through the dental arch of the device according to FIGS. 1 and 2 in the region of the molar teeth.

The device 10 for cleaning teeth is shown in FIGS. 1 to 3. The device 10 has a mouthpiece 20 in the form of an approximately horseshoe-shaped dental arch 22. The mouthpiece 20 is connected to a retaining unit 26 via a connecting part 24. In order to be able to exchange the mouthpiece 20, the mouthpiece 20 is attached releasably to the connecting part 24 in the present example. The retaining unit 26 has an integrated motor drive 28.

The dental arch 22 is designed as a closed hollow body (see FIG. 3). The side edges 30, 32 of the dental arch 22 are formed respectively from a stiff plastic material. The upper sides and lower sides of the dental arch 22 that face the teeth on the other hand have respectively a tooth-cleaning film 34, 36. The tooth-cleaning films 34, 36 have respectively an individualized surface contour matched to the tooth shape and jaw shape of the user. The tooth-cleaning film 34 is thus matched to the tooth shape and jaw shape of the upper jaw in the present example, whereas the tooth-cleaning film 36 is matched to the tooth shape and jaw shape of the lower jaw. The individual depressions of the dental arch 22 for the teeth of the lower jaw and of the upper jaw thus do not have only a U-shape or V-shape contour. Rather, the depressions are matched individually so that the dental arch 22 can be used only for one user. Hence, optimum matching of the dental arch 22 and hence also an optimum cleaning result may be achieved.

The tooth-cleaning films 34, 36 are guided respectively some way around the side edges 30, 32 of the dental arch 22 and attached on the outer side of the side edges 30, 32. A gaseous medium is located in the interior 38 of the dental arch 22 in the present example.

With intended use, the dental arch 22 is pushed into the mouth of the user and the mouth is then closed. The lips of the user thus come to rest on the connecting part 24. The teeth of the user are located in the depressions of the dental arch 22 and are surrounded by the tooth-cleaning film 34, 36. The tooth-cleaning film 34, 36 may thus rest directly on the teeth of the user, or also may have a short distance from the teeth of the user.

The retaining unit 26 remains outside of the mouth and may be held by the user himself or by a third party. The tooth-cleaning films 34, 36 may be set into oscillation by the motor drive 28.

In the present example, the retaining unit 26 does not have an operating button for switching on and switching off the motor drive 28. Rather, a pressure sensor 40, by means of which the motor drive 28 may be switched on and switched off, is located in the region of the front incisors. If the dental arch 22 is inserted correctly in the mouth and the jaw closed, a previously defined threshold value at the pressure sensor 40 is exceeded and the motor drive 28 is switched on. On the other hand, if the mouth is opened again, the motor drive 28 is automatically switched off. On the other hand, if a certain threshold value at the pressure sensor 40 is exceeded, likewise automatic switching-off of the motor drive 28 may take place.

In order to be able to check the correct positioning of the dental arch 22 in the mouth, the dental arch 22 has in the present example in total three contact points 42, 44, 46. Only when the teeth of the user are in contact with the dental arch at the point of the contact points 42, 44, 46 via the tooth-cleaning films 34, 36 does the tooth-cleaning film 34, 36 surround the respective jaw correctly and the cleaning process may start. In the present example, the contact point 42 is arranged in the region of the front incisors and hence also in the region of the pressure sensor 40. The two rear contact points 44, 46 are arranged on both sides respectively in the region of the rearmost tooth, that is, in the region of the rearmost molar tooth or wisdom tooth.

The invention claimed is:

1. A device (10) for cleaning teeth, comprising:
    a mouthpiece (20) in form of a substantially horseshoe-shaped dental arch (22);
    a retaining unit (26); and
    a motor drive (28),
    wherein the dental arch (22) is a closed hollow body, and
    wherein a side of the hollow body (22) that faces the teeth has a tooth-cleaning film (34, 36),
    wherein the tooth-cleaning film (34, 36) has an individualized surface contour matched to a tooth shape and jaw shape, and
    wherein the tooth-cleaning film (34, 36) can be set into oscillation by the motor drive (28).

2. The device as claimed in claim 1, wherein an interior (38) of the closed hollow body (22) is filled with a liquid or a gas.

3. The device as claimed in claim 1,
    wherein the hollow body (22) has a first tooth-cleaning film (34) for the upper jaw and a second tooth-cleaning film (36) for the lower jaw, and
    wherein the two tooth-cleaning films (34, 36) have respectively an individualized surface contour matched to the tooth shape and jaw shape.

4. The device as claimed in claim 3,
    wherein the two tooth-cleaning films (34, 36) for the upper jaw and for the lower jaw consist of an identical material.

5. The device as claimed in claim 3,
    wherein the dental arch (22) has a pressure sensor (40) for switching on and switching off the motor drive (28).

6. The device as claimed in claim 5,
    wherein the pressure sensor (40) is arranged in a region of the front incisors.

7. The device as claimed in claim 1,
    wherein the tooth-cleaning film (34, 36) can be shaped.

8. The device as claimed in claim 1,
    wherein the tooth-cleaning film (34, 36) is formed by deep drawing or by hot stamping.

9. The device as claimed in claim 1,
    wherein the tooth-cleaning film (34, 36) has been produced by deep drawing, hot stamping, dip molding, casting, 3D-printing methods or injection molding.

10. The device as claimed in claim 1,
    wherein the tooth-cleaning film (34, 36) is latex-free.

11. The device as claimed in claim 1,
    wherein the tooth-cleaning film (34, 36) consists of biocompatible silicone.

12. The device as claimed in claim 1,
    wherein the tooth-cleaning film (34, 36) consists of thermoplastic polyurethane or of a composite of thermoplastic polyurethane and silicone.

13. The device as claimed in claim 1,
    wherein the mouthpiece (20) is attached releasably to the retaining unit (26).

14. The device as claimed in claim 1,
    wherein the motor drive (28) is arranged within the retaining unit (26).

15. The device as claimed in claim 1,
    wherein the dental arch (22) has individualized contact points (42, 44, 46).

16. The device as claimed in claim 15,
    wherein the individualized contact points (42, 44, 46) are arranged in a region of the front teeth and/or at a distal margin strips of the respective rearmost teeth.

17. The device as claimed in claim 1,
    wherein the tooth-cleaning film (34, 36) has an individualized surface contour matched to a tooth shape and jaw shape with an offset between 0.1 mm and 2 mm.

18. The device as claimed in claim 1,
    wherein the dental arch (22) does not include bristles.

* * * * *